US012678817B2

(12) United States Patent
Fritz et al.

(10) Patent No.: US 12,678,817 B2
(45) Date of Patent: Jul. 14, 2026

(54) CLEANING DEVICE FOR CLEANING A NOZZLE APPLICATOR AND CORRESPONDING CLEANING METHOD

(71) Applicant: Dürr Systems AG, Bietigheim-Bissingen (DE)

(72) Inventors: Hans-Georg Fritz, Ostfildern (DE); Benjamin Wöhr, Eibensbach (DE); Jerome Lavallée, Albstadt (DE); Moritz Bubek, Ludwigsburg (DE); Timo Beyl, Besigheim (DE); Daniel Tandler, Stuttgart (DE); Tobias Berndt, Ditzingen (DE)

(*) Notice: Subject to any disclaimer, the term of this patent is extended or adjusted under 35 U.S.C. 154(b) by 628 days.

(21) Appl. No.: 17/785,937

(22) PCT Filed: Dec. 1, 2020

(86) PCT No.: PCT/EP2020/084093
§ 371 (c)(1),
(2) Date: Jun. 16, 2022

(87) PCT Pub. No.: WO2021/121965
PCT Pub. Date: Jun. 24, 2021

(65) Prior Publication Data

US 2023/0029407 A1 Jan. 26, 2023

(30) Foreign Application Priority Data

Dec. 20, 2019 (DE) ..................... 10 2019 135 360.2

(51) Int. Cl.
*B05B 15/555* (2018.01)
*B05B 15/58* (2018.01)
*B05B 12/08* (2006.01)

(52) U.S. Cl.
CPC ............ *B05B 15/555* (2018.02); *B05B 15/58* (2018.02); *B05B 12/082* (2013.01)

(58) Field of Classification Search
CPC ..... B05B 15/555; B05B 15/58; B05B 12/082; B05B 15/55; B05B 15/50
(Continued)

(56) References Cited

U.S. PATENT DOCUMENTS 5,570,116 A * 10/1996 Soga .................... B41J 2/16523 347/30
5,725,647 A * 3/1998 Carlson ................ C09D 11/326 106/31.89
(Continued)

FOREIGN PATENT DOCUMENTS

DE 102007036585 A1 4/2009
DE 10 2013 002 412 A1 8/2014
(Continued)

OTHER PUBLICATIONS

Chinese State Intellectual Property Office First Notice of Examination Action and Search Report for related application No. CN202080088848.8 mailed Jan. 19, 2024 (22 Pages; with English translation).
(Continued)

*Primary Examiner* — Chee-Chong Lee
(74) *Attorney, Agent, or Firm* — Taft Stettinius & Hollister LLP; Thomas E. Bejin; John W. Carpenter

(57) ABSTRACT

The disclosure relates to a cleaning device for cleaning a nozzle applicator, which is designed for applying a coating agent to a component and has a plurality of application nozzles in a nozzle region in order to discharge the coating agent through the application nozzles during application in an application direction. The cleaning device comprises a rinsing agent supply for supplying a rinsing agent for cleaning the nozzle applicator, and a docking interface for docking the nozzle applicator to be cleaned to the cleaning device. The disclosure provides that the docking interface is configured to flush the rinsing agent into the nozzle appli-
(Continued)

cator through the application nozzles of the nozzle applicator in a direction opposite to the normal application direction. Furthermore, the disclosure comprises a corresponding cleaning method.

12 Claims, 17 Drawing Sheets

(58) Field of Classification Search
USPC .......................................................... 239/122
See application file for complete search history.

(56) References Cited

U.S. PATENT DOCUMENTS

| | | | |
|---|---|---|---|
| 5,738,716 A * | 4/1998 | Santilli .................. | C09D 11/40 106/31.77 |
| 5,774,140 A * | 6/1998 | English ................ | B41J 2/16547 347/33 |
| 5,786,829 A * | 7/1998 | Pasciak, Jr. ............ | B41J 2/1707 347/30 |
| 6,142,601 A | 11/2000 | Sharma et al. | |
| 9,414,827 B2 | 8/2016 | Salomon | |
| 9,452,451 B2 | 9/2016 | Kleiner et al. | |
| 11,167,302 B2 | 11/2021 | Fritz et al. | |
| 11,331,921 B2 | 5/2022 | Provenaz | |
| 2005/0237357 A1 | 10/2005 | Usuda | |
| 2014/0075695 A1 | 3/2014 | Kleiner et al. | |
| 2016/0317139 A1 | 11/2016 | Salomon | |
| 2019/0308211 A1 | 10/2019 | Fritz et al. | |
| 2019/0337006 A1 | 11/2019 | Fritz et al. | |
| 2020/0324549 A1 | 10/2020 | Provenaz | |
| 2022/0040719 A1 | 2/2022 | Fritz et al. | |

FOREIGN PATENT DOCUMENTS

| | | |
|---|---|---|
| DE | 10 2016 014 951 A1 | 6/2018 |
| DE | 10 2016 014 955 A1 | 6/2018 |
| DE | 10 2018 131 380 A1 | 6/2020 |
| EP | 1005997 A1 | 6/2000 |
| EP | 3725421 A1 | 10/2020 |
| JP | 2000168097 A | 6/2000 |
| JP | 2002192751 A | 7/2002 |
| JP | 2006110822 A | 4/2006 |
| JP | 2007283747 A | 11/2007 |
| JP | 2012096464 A | 5/2012 |
| JP | 2012130822 A | 7/2012 |
| WO | 2012069137 A1 | 5/2012 |

OTHER PUBLICATIONS

International Search Report and Written Opinion for PCT/EP2020/084093 mailed Feb. 26, 2021 (20 pages; with English translation).

German Patent Office—Office Action for Application No. DE102019135360.2 mailed Aug. 24, 2020 (14 pages; with English machine translation).

Korean Intellectual Property Office Notice of Allowance for application No. 10-2022-7020965 mailed May 26, 2025 (9 pages; English translation available).

* cited by examiner

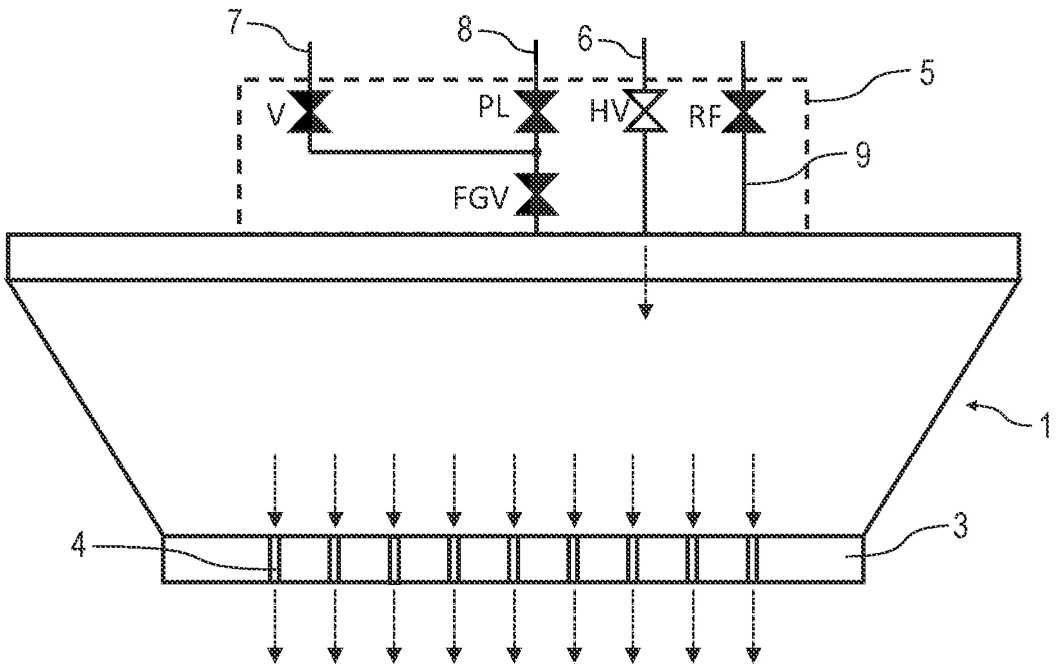
Fig. 1
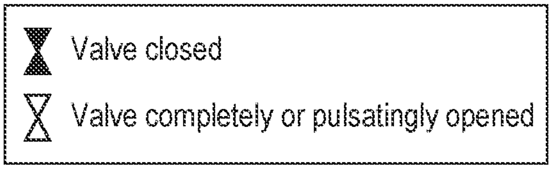

CLEANING DEVICE FOR CLEANING A NOZZLE APPLICATOR AND CORRESPONDING CLEANING METHOD

CROSS-REFERENCE TO RELATED APPLICATIONS

This application is a national stage of, and claims priority to, Patent Cooperation Treaty Application No. PCT/EP2020/084093, filed on Dec. 1, 2020, which application claims priority to German Application No. DE 10 2019 135 360.2, filed on Dec. 20, 2019, which applications are hereby incorporated herein by reference in their entireties.

FIELD

The disclosure relates to a cleaning device for cleaning a nozzle applicator which is designed for applying a coating agent to a component and has a plurality of application nozzles in a nozzle region in order to discharge the coating agent through the application nozzles during application in an application direction. Furthermore, the disclosure comprises a corresponding cleaning method.

BACKGROUND

In modern painting systems for painting motor vehicle body components, rotary atomizers are usually used as application devices, which deliver a spatially relatively extended spray jet of the paint to be applied. When the paint is changed, such rotary atomizers must be cleaned to prevent contamination by the old paint. For this purpose, cleaning devices are known from the state of the art (e.g. WO 2012/069137 A1) that enable cleaning of the rotary atomizers. For this purpose, the rotary atomizer to be cleaned is inserted into the cleaning device and then cleaned inside the cleaning device. On the one hand, the internal cleaning of the rotary atomizer is carried out by rinsing out residues of the old paint. On the other hand, external cleaning of the rotary atomizer is also carried out in the cleaning device by rinsing the outer surfaces of the rotary atomizer with a rinsing agent.

In a more recent line of development, on the other hand, the application devices used are not rotary atomizers but so-called print heads, such as those known from DE 10 2013 002 412 A1, for example. Such print heads are also referred to as nozzle applicators because they have numerous application nozzles, each of which emits a relatively narrowly limited coating agent jet. In contrast to the known rotary atomizers, the nozzle applicators do not emit a spatially extended spray jet of the coating agent, but a spatially narrowly limited coating agent jet, which can, for example, be coherent in the longitudinal direction of the jet or consists of several coating agent droplets spaced apart in the longitudinal direction of the jet. Such nozzle applicators also have to be cleaned during a color change. However, the known cleaning devices are designed for rotary atomizers and are therefore only suitable for cleaning nozzle applicators to a limited extent.

The disclosure is therefore based on the task of creating a cleaning device that is as suitable as possible for cleaning nozzle applicators. Furthermore, the disclosure comprises the task of specifying a corresponding cleaning method.

With regard to the prior art, reference should also be made to DE 10 2015 014 955 A1 and DE 10 2016 014 951 A1.

BRIEF DESCRIPTION OF THE DRAWINGS

FIG. 1: a schematic representation of a nozzle applicator which can be cleaned with the cleaning device according to the disclosure.

DETAILED DESCRIPTION

Figure 2:
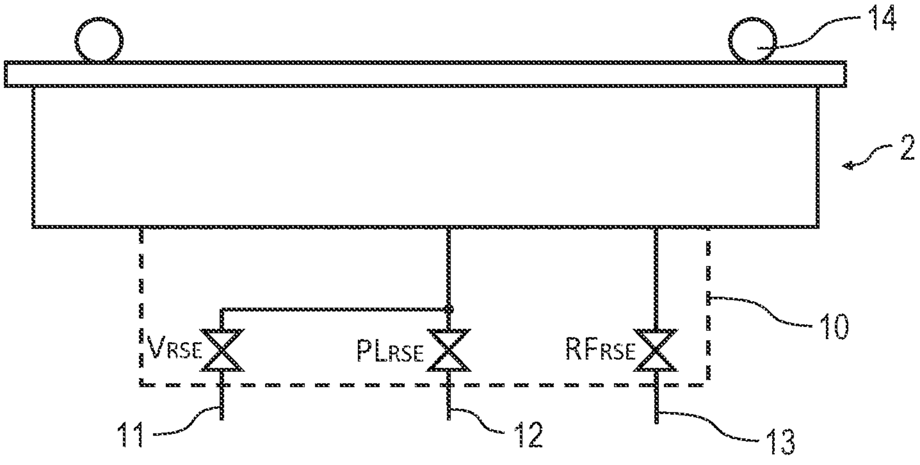
FIG. 2: a schematic representation of the cleaning device according to the disclosure.

The disclosure provides a cleaning device which is structurally adapted to clean a nozzle applicator. It should be mentioned here that the term nozzle applicator used in the context of the disclosure is to be distinguished from conventional rotary atomizers or air atomizers. Thus, the nozzle applicator does not deliver a spatially extended spray jet of the coating agent, as is the case with a conventional rotary atomizer. Rather, the nozzle applicator applies a spatially narrow coating agent jet, which can have a narrow jet expansion angle of less than 10°, 5° or even less than 2°. With regard to the nozzle applicator, it should further be mentioned that the coating agent jet can optionally consist of individual coating agent drops which are spaced apart in the longitudinal direction of the jet. Alternatively, however, it is also possible for the individual coating agent jets to be contiguous in the longitudinal direction of the jet. Furthermore, it should be mentioned with respect to the nozzle applicator that it preferably operates substantially overspray-free, in particular with an application efficiency of more than 80%, 90% or even more than 95%. In one example of the disclosure, the nozzle applicator is a print head such as is known, for example, from DE 10 2013 002 412 A1. Finally, with respect to the nozzle applicator, it should be mentioned that the nozzle applicator preferably comprises numerous applicator nozzles, for example more than 5, 10, 20, 30 or even more than 50 applicator nozzles, which may for example be arranged in one row or in several adjacent rows.

In accordance with known cleaning devices for rotary atomizers, the cleaning device according to the disclosure also includes a rinsing agent supply via which a rinsing agent for cleaning the nozzle applicator can be supplied. For example, the rinsing agent supply can have a pulsed air supply and a rinsing agent supply, as will be described in detail.

Furthermore, in accordance with known cleaning devices for rotary atomizers, the cleaning device according to the disclosure also comprises a docking interface for docking the nozzle applicator to be cleaned to the cleaning device.

The cleaning device according to the disclosure differs from the known cleaning devices for rotary atomizers in that the docking interface is designed in such a way that the rinsing agent can be flushed into the nozzle applicator through the application nozzles of the nozzle applicator against the normal application direction. In contrast, the known cleaning devices for rotary atomizers are only suitable for spraying the outer surfaces of the rotary atomizers with rinsing agent. In this case, however, it is not possible to flush rinsing agent into the rotary atomizer from the outside. However, flushing a rinsing agent through the application nozzles in the opposite direction to the normal application direction is advantageous because it can remove a clogging or partial contamination of the nozzle channel of the application nozzles by flushing out the clogging or contamination inwardly.

In an example of the disclosure, the docking interface has a seal that seals the nozzle region of the applicator in a fluid-tight and optionally also pressure-tight manner when docked, to allow the rinsing agent to be flushed into the nozzle applicator through the application nozzles counter to the normal application direction. This is useful so that the rinsing agent is not merely released into the environment when it is applied to the nozzle region of the nozzle applicator. Preferably, the seal here is annular and surrounds the nozzle region with the application nozzles. It should be mentioned here that the seal does not necessarily have to be round, but can also be angular in shape. In the preferred embodiment, the cleaning device on the one hand and the nozzle applicator on the other hand thus enclose a flushing-in space which is sealed off from the environment by the seal. The cleaning device can thus introduce rinsing agent (e.g. pulse air, rinsing agent) into the flushing-in space so that the application nozzles of the nozzle applicator are impinged with the rinsing agent on the outside. The rinsing agent can then penetrate the nozzle applicator through the application nozzles in the opposite direction to the normal application direction in order to loosen clogging or contamination of the application nozzles.

In the example of the disclosure, the rinsing agent supply of the cleaning device comprises at least one rinsing agent valve which is controllable to control the inflow of the rinsing agent. Furthermore, the rinsing agent supply preferably comprises an air supply for supplying pulsed air, as is known per se from the prior art. In this case, a controllable compressed air valve is arranged in the air supply in order to control the supplied pulse air or, if necessary, an air flow for nozzle drying. In addition, the rinsing agent supply system preferably comprises a rinsing agent supply system for supplying a rinsing agent. A controllable rinsing agent valve is also arranged in the rinsing agent supply line in order to be able to control the rinsing agent flow. It should be mentioned here that the term "rinsing agent" used in the context of the disclosure preferably refers to liquid rinsing agents which are adapted to the particular coating used. The term rinsing agent thus also includes water-based liquids as well as liquids based on organic solvents. This also includes mixtures which, in addition to water and/or organic solvents, also contain other substances, such as wetting agents, co-solvents or other additives. In addition, the cleaning device according to the disclosure has a return system to remove residues of the coating agent. A controllable return valve may be arranged in the return system to control the flow of material into the return system. The return system and the rinsing agent supply of the cleaning device preferably open into the aforementioned flushing-in space between the cleaning device and the nozzle applicator.

Furthermore, it should be mentioned that the nozzle applicators to be cleaned preferably also have at least one rinsing agent supply, whereby a rinsing agent valve can also be arranged in the rinsing agent supply of the nozzle applicator. In the preferred embodiment of the disclosure, the rinsing agent supply of the nozzle applicator has a compressed air supply with a compressed air valve and a rinsing agent supply with a rinsing agent valve, in order to be able to supply alternately pulsed air and rinsing agent, as is known per se from the prior art of rotary atomizers. On the outlet side, the compressed air supply and the rinsing agent supply preferably open into an additional release valve that can control the flow of rinsing agent or pulse air. In addition, the nozzle applicator also preferably has a return system for discharging residual coating agent. A return valve is also preferably arranged in the return system of the nozzle applicator in order to control the material flow into the return system of the nozzle applicator. Furthermore, it should be mentioned that the nozzle applicator preferably comprises at least one main valve which controls the coating agent delivery. In the case of a large number of application nozzles, it is possible for each application nozzle or group of application nozzles to be assigned a main valve.

Alternatively, however, it is also possible for the nozzle applicator to have only a single main valve for all application nozzles. However, the main valve is of secondary importance in the context of the disclosure, so that only a single main valve is mentioned in each case below. It is understood, however, that a main valve may be provided for each of the individual application nozzles.

Furthermore, the cleaning device according to the disclosure preferably includes a control unit which controls the following valves:

- The rinsing agent valve of the cleaning device, in particular the compressed air valve and the rinsing agent valve of the cleaning device,
- the at least one return valve of the cleaning device,
- the rinsing agent valve of the nozzle applicator, in particular the compressed air valve, the rinsing agent valve and, if necessary, the release valve,
- the at least one return valve of the nozzle applicator, and/or the at least one main valve of the nozzle applicator.

In this context, the control unit can activate several different cleaning modes by appropriately controlling the various valves, which are briefly described below.

In a first cleaning mode, the nozzle applicator is docked to the docking interface of the cleaning device, whereby compressed air and rinsing agent are then flushed into the nozzle applicator from the cleaning device against the normal application direction through the application nozzles and leave the nozzle applicator again through the return system of the nozzle applicator. For this purpose, the various valves are controlled as follows:

The rinsing agent valve of the cleaning device is opened continuously or pulsatingly, the compressed air valve of the cleaning device is opened continuously or pulsatingly, the return valve of the cleaning device is closed, the rinsing agent valve of the nozzle applicator is closed, the compressed air valve of the nozzle applicator is closed, and the at least one return valve of the nozzle applicator is opened.

This first cleaning mode is advantageous because stuck clogs or contaminants in the application nozzles can be loosened by directing pulse air and rinsing agent through the clogged application nozzles against the normal application direction.

In a second cleaning mode, on the other hand, it is envisaged that the nozzle applicator is docked to the docking interface of the cleaning device, whereby compressed air and rinsing agent are flushed out of the nozzle applicator into the cleaning device starting from the nozzle applicator in the normal application direction through the applicator nozzles, and then leave the cleaning device again through the return system of the cleaning device. For this purpose, the various valves are controlled as follows:

The rinsing agent valve of the cleaning device is closed, the compressed air valve of the cleaning device is closed, the at least one return valve of the cleaning device is opened, the rinsing agent valve of the nozzle applicator is opened continuously or pulsatingly, the compressed air valve of the nozzle applicator is opened continuously or pulsatingly, and the at least one return valve of the nozzle applicator is closed.

The second cleaning mode can be controlled alternately with the first cleaning mode to loosen stuck clogs or contaminants by alternating forward and backward movements of the rinsing agent or pulsed air.

In addition, the control unit can alternatively set a third cleaning mode in which the nozzle applicator is docked to the docking interface of the cleaning device so that compressed air and rinsing agent enter the nozzle applicator from the nozzle applicator and then exit the nozzle applicator again through the return system of the nozzle applicator. Thus, in this third cleaning mode, the cleaning device is not actively involved, but merely serves to seal the nozzle region from the outside so that the environment is not contaminated. In this third cleaning mode, the various valves are actuated as follows:

The rinsing agent valve of the cleaning device is closed, the compressed air valve of the cleaning device is closed, the at least one return valve of the cleaning device is closed, the rinsing agent valve of the nozzle applicator is opened continuously or pulsatingly, the compressed air valve of the nozzle applicator is opened continuously or pulsatingly, and the at least one return valve of the nozzle applicator is opened.

Furthermore, the cleaning device according to the disclosure also allows a fourth cleaning mode in which the nozzle applicator is also docked to the docking interface of the cleaning device, whereby compressed air and rinsing agent are then flushed in starting from the cleaning device and leaving the cleaning device again through the return system of the cleaning device. Thus, the nozzle applicator does not play an active role here, as the rinsing agent (e.g., compressed air and rinsing agent) is supplied by the cleaning device and is also discharged again via the cleaning device. In this fourth cleaning mode, the various valves are controlled as follows:

The rinsing agent valve of the cleaning device is opened continuously or pulsatingly, the compressed air valve of the cleaning device is opened continuously or pulsatingly, the at least one return valve of the cleaning device is opened, the rinsing agent valve of the nozzle applicator is closed, the compressed air valve of the nozzle applicator is closed, and the at least one return valve of the nozzle applicator is closed.

Furthermore, the cleaning device according to the disclosure also enables a fifth cleaning mode, in which the nozzle applicator is also docked to the docking interface of the cleaning device, wherein compressed air flows from the cleaning device against the normal application direction through the application nozzles of the nozzle applicator and then leaves the nozzle applicator again through the at least one return valve of the nozzle applicator. It should be mentioned here that in this fifth cleaning mode, no rinsing agent is used, but only compressed air, in order to remove impurities from the internal lines and surfaces of the nozzle applicator by means of the compressed air impingement and to dry them. For this purpose, the various valves are controlled as follows:

The rinsing agent valve of the cleaning device is closed, the compressed air valve of the cleaning device is opened continuously or pulsatingly, the at least one return valve of the cleaning device is closed, the rinsing agent valve of the nozzle applicator is closed, the compressed air valve of the nozzle applicator is closed, and the at least one return valve of the nozzle applicator is opened.

Finally, the cleaning device according to the disclosure preferably also enables a sixth cleaning mode, which is used to dry outer surfaces of the nozzle applicator. In this mode, the nozzle applicator is undocked from the docking interface of the cleaning device, but the nozzle applicator still remains within the range of action of the cleaning device so that the compressed air emitted by the cleaning device can reach and dry the outer surfaces of the nozzle applicator. For this purpose, the various valves are controlled as follows:

The rinsing agent valve of the cleaning device is closed, the compressed air valve of the cleaning device is opened continuously or pulsatingly, the at least one return valve of the cleaning device is closed, the rinsing agent valve of the nozzle applicator is closed, the compressed air valve of the nozzle applicator is closed, and the at least one return valve of the nozzle applicator is closed.

It was mentioned above that the control unit can switch between the different cleaning modes to achieve the most effective cleaning. For example, the control unit can switch between the first cleaning mode and the second cleaning mode to rinse the application nozzles alternately in the normal application direction and against the normal application direction. In addition, it can activate the control unit during a cleaning process a sequence of the different cleaning modes, for example in the following order:

First cleaning mode,
second cleaning mode,
optionally third cleaning mode,
optionally fourth cleaning mode,
optional fifth cleaning mode,
optional sixth cleaning mode.

Furthermore, it should be mentioned that the disclosure does not only claim protection for the cleaning device according to the disclosure described above. Rather, the disclosure also claims protection for a complete cleaning system which, in addition to the cleaning device according to the disclosure, also comprises a multi-axis application robot for positioning the nozzle applicator.

Furthermore, the cleaning system according to the disclosure may also comprise a jet checking device for checking the coating agent jets emitted by the application nozzles, the jet checking device preferably being structurally integrated into the cleaning system. Such jet checking devices are known, for example, from the German patent application DE 10 2018 131 380 A1, so that the contents of this earlier patent application are to be fully attributed to the present description with respect to the construction and operation of the jet checking device.

The control unit is preferably connected to the application robot on the output side and controls the application robot. Outwardly, the control unit is preferably also connected to the cleaning device and controls the cleaning device accordingly. On the input side, however, the control unit is preferably connected to the jet checking device in order to be able to take the results of the jet checking into account. It should be mentioned here that the control unit is not necessarily concentrated in a single hardware unit. Rather, it is also possible for the control unit to be distributed over several hardware components and to be implemented wholly or partially in software.

The control unit preferably controls the jet checking device to inspect the coating agent jets emitted by the application nozzles in order to be able to detect clogging or contamination of the application nozzles. The control unit then preferably controls the cleaning device for cleaning the application nozzles. Here, it is possible that the cleaning is limited to those application nozzles for which the jet checking device has detected a blockage.

Finally, the disclosure also claims protection for a corresponding cleaning method, whereby the various steps of the cleaning method according to the disclosure already result from the above description, so that a separate description of the cleaning method according to the disclosure can be dispensed with.

FIG. 1 shows a schematic representation of a nozzle applicator 1 which can be cleaned by a cleaning device 2 according to the disclosure, as will be described in detail. The nozzle applicator 1 has a nozzle plate 3 with numerous application nozzles 4, wherein the application nozzles 4 can, for example, be arranged in one or more parallel rows. Furthermore, the nozzle applicator 1 comprises a valve unit 5 including at least one main valve HV controlling the paint flow through a paint supply 6. Furthermore, the valve unit 5 has a rinsing agent supply 7 with a rinsing agent valve V and a pulsed air supply 8 with a pulsed air valve PL. Downstream of the pulsed air valve 8 and the rinsing agent valve 7 is a common release valve FGV, which releases the rinsing agent or the pulsed air. In addition, the valve unit 5 of the nozzle applicator 1 has a return system 9 in order to be able to return coating agent residues. A controllable return valve RF is located in the return system 9.

The drawing in FIG. 1 shows the valve positions during application operation. In this case, the main valve HV is open, so that coating is supplied via the paint supply 6 and leaves the application nozzles 4 in the direction of the arrow. During this normal application operation, the rinsing agent valve V, the pulsed air valve PL, the release valve FGV and the return valve RF of the nozzle applicator 1 are closed.

The valve position is indicated here and below in the drawings by a valve symbol drawn filled in reflecting a closed valve, while a valve symbol drawn not filled in reflects a fully or pulsatingly open valve.

FIG. 2 shows a schematic representation of the cleaning device 2 according to the disclosure for cleaning the nozzle applicator 1 according to FIG. 1. Thus, the cleaning device 2 has a valve unit 10, which can also be referred to as a back-flushing unit and is connected to a rinsing agent supply 11, a pulsed air supply 12 and a return system 13. In the rinsing agent supply 11 there is a rinsing agent valve $V_{RSE}$, in the pulsed air supply 12 there is a pulsed air valve $PL_{RSE}$ and in the return system 13 there is a return valve $RF_{RSE}$.

Furthermore, it should be mentioned that the cleaning device 2 comprises a docking interface in order to be able to dock the nozzle applicator 1 to be cleaned during a cleaning method. The docking interface comprises an annular seal 14 which, in the docked state (cf. FIG. 6A), seals a flushing-in space 15 from the outside. In the docked state, the nozzle applicator 1 on the one hand and the cleaning device 2 on the other hand thus enclose the flushing-in space 15, with the seal 14 sealing the flushing-in space 15 to the outside in a fluid-tight and pressure-tight manner. This is useful so that the cleaning device 2 can flush rinsing agent and pulse air into the application nozzles 4 by pressurization in the flushing-in space 15, as will be described in detail.

Figure 3:
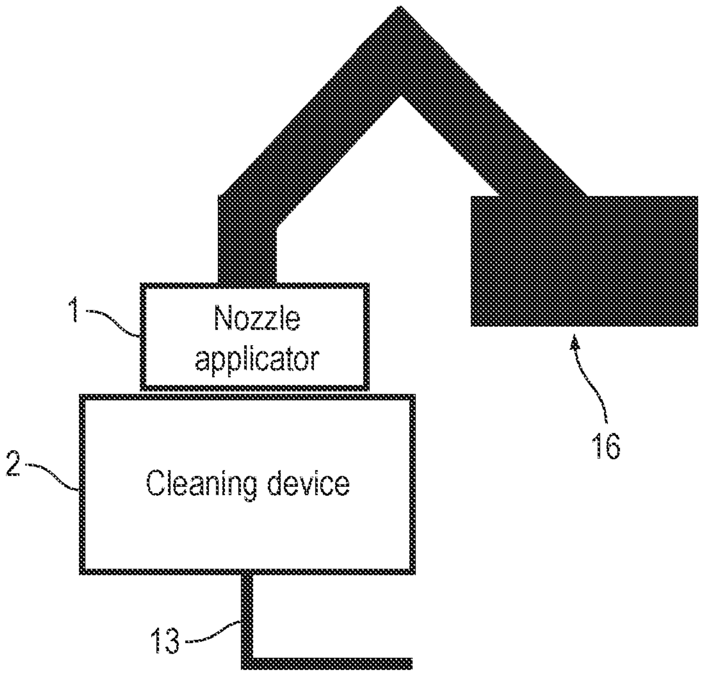
FIG. 3: a schematic representation of the cleaning device according to the disclosure during cleaning of the nozzle applicator, which is guided by an application robot.

FIG. 3 shows a schematic representation of the nozzle applicator 1 with the cleaning device 2 and an application robot 16 that guides the nozzle applicator 1. The drawing shows the nozzle applicator 1 at a small distance above the cleaning device 2, i.e. in the undocked state. In this state, the outer surfaces of the nozzle applicator 1 can be blown by compressed air from the cleaning device 2 to dry the outer surfaces, as will be described in detail.

Figure 4:
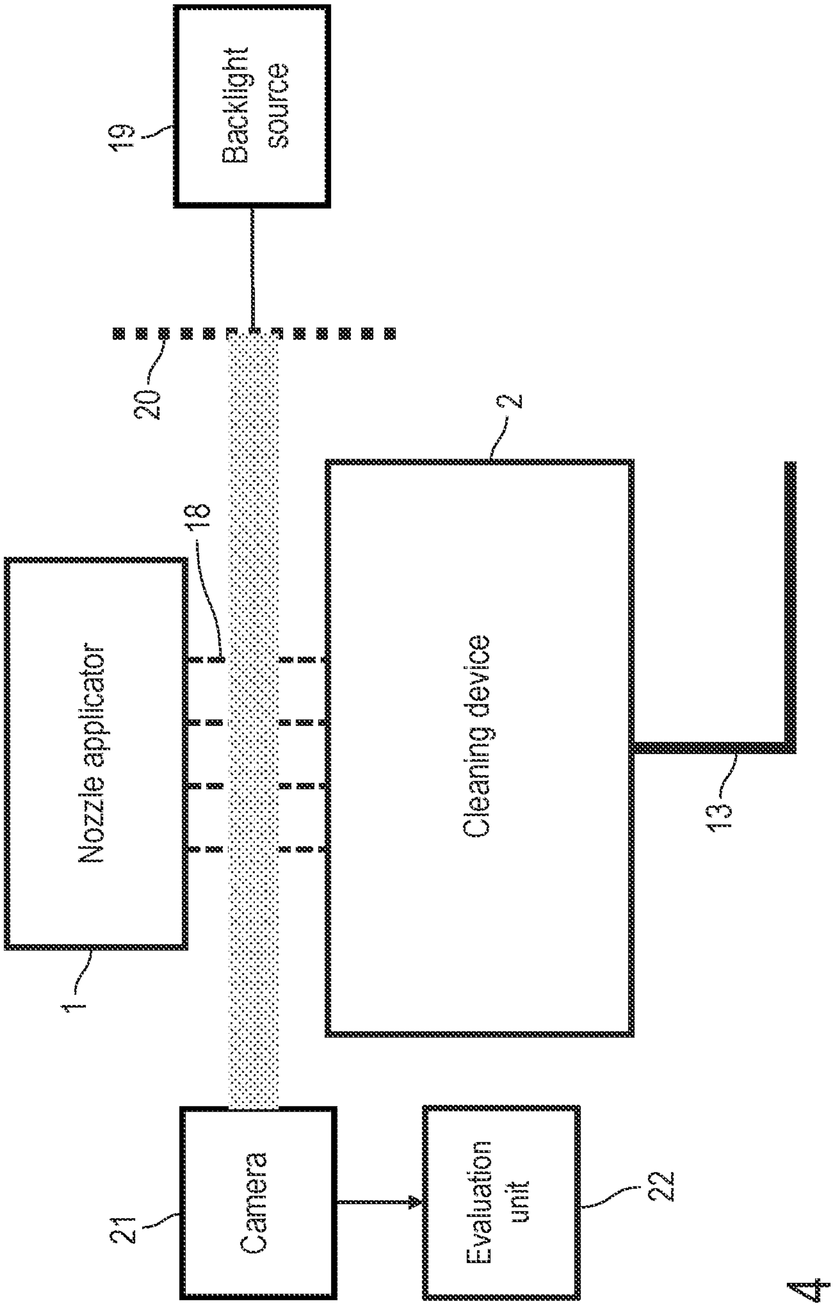
FIG. 4: a schematic representation of a jet checking device for detecting clogging of the application nozzles of the nozzle applicator.

FIG. 4 shows a schematic representation of a jet checking device 17 (see also FIG. 5), as also described in DE 10 2018 131 380 A1, so that reference is made to this earlier patent application with regard to the details of the operation and construction of the jet checking device. The jet checking device has the task of checking coating agent jets 18 emitted by the nozzle applicator 1 in order to be able to detect clogging or contamination of the application nozzles 4. For this purpose, the nozzle applicator 1 is placed by the application robot 16 at a small distance above the cleaning device 2, whereby the coating agent jets 17 are then emitted into the cleaning device 2. A backlight source 19 illuminates the coating agent jets 18 from the side via a diffuser 20, whereby a camera 21 records an image which is forwarded to an evaluation unit 22. By evaluating the camera image, the evaluation unit 22 can then detect whether the coating agent jets 18 are in order or not, which would indicate clogging or contamination of the associated applicator nozzle 4.

Figure 5:
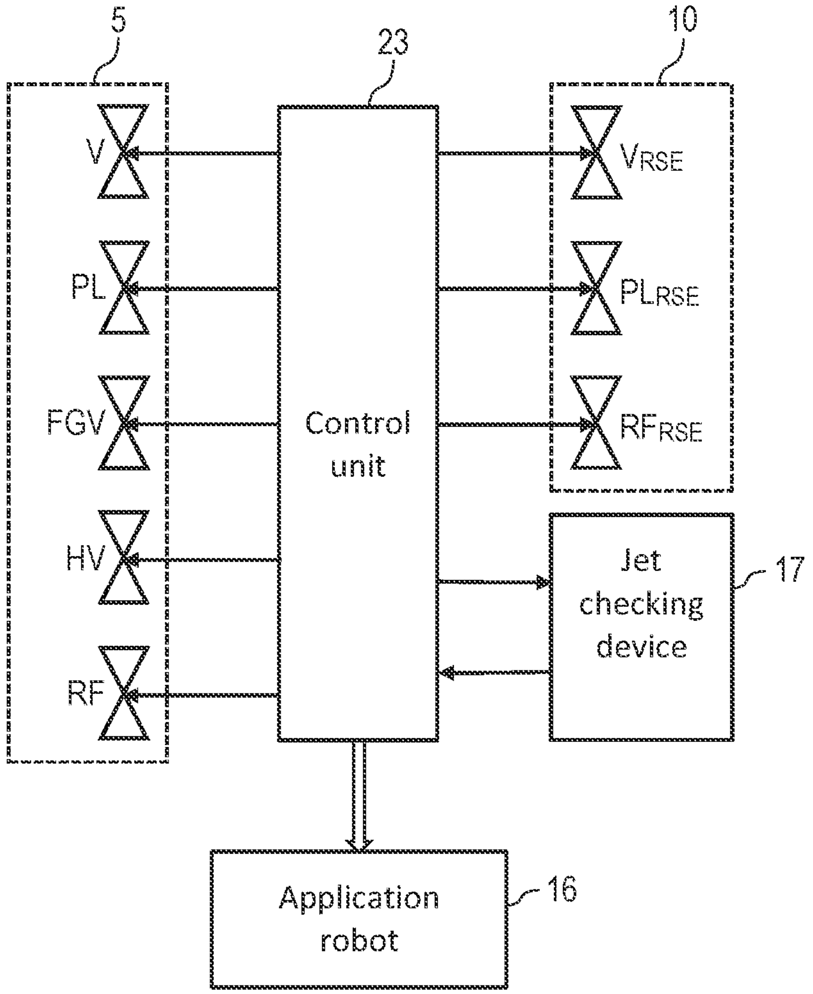
FIG. 5: a schematic representation of the control of the jet checking device, the application robot and the valves of the nozzle applicator and the cleaning device.

FIG. 5 shows a schematic representation of the control arrangement for controlling the valve unit 5 of the nozzle applicator 1 and the valve unit 10 of the cleaning device 2 by a control unit 23, which also controls the application robot 16 and receives the evaluation from the jet checking unit 23. It should be mentioned here that the control unit 23 is shown as a unitary component. However, it is possible within the scope of the disclosure that the control unit 23 with its function is distributed over several different hardware components.

Figure 6A:
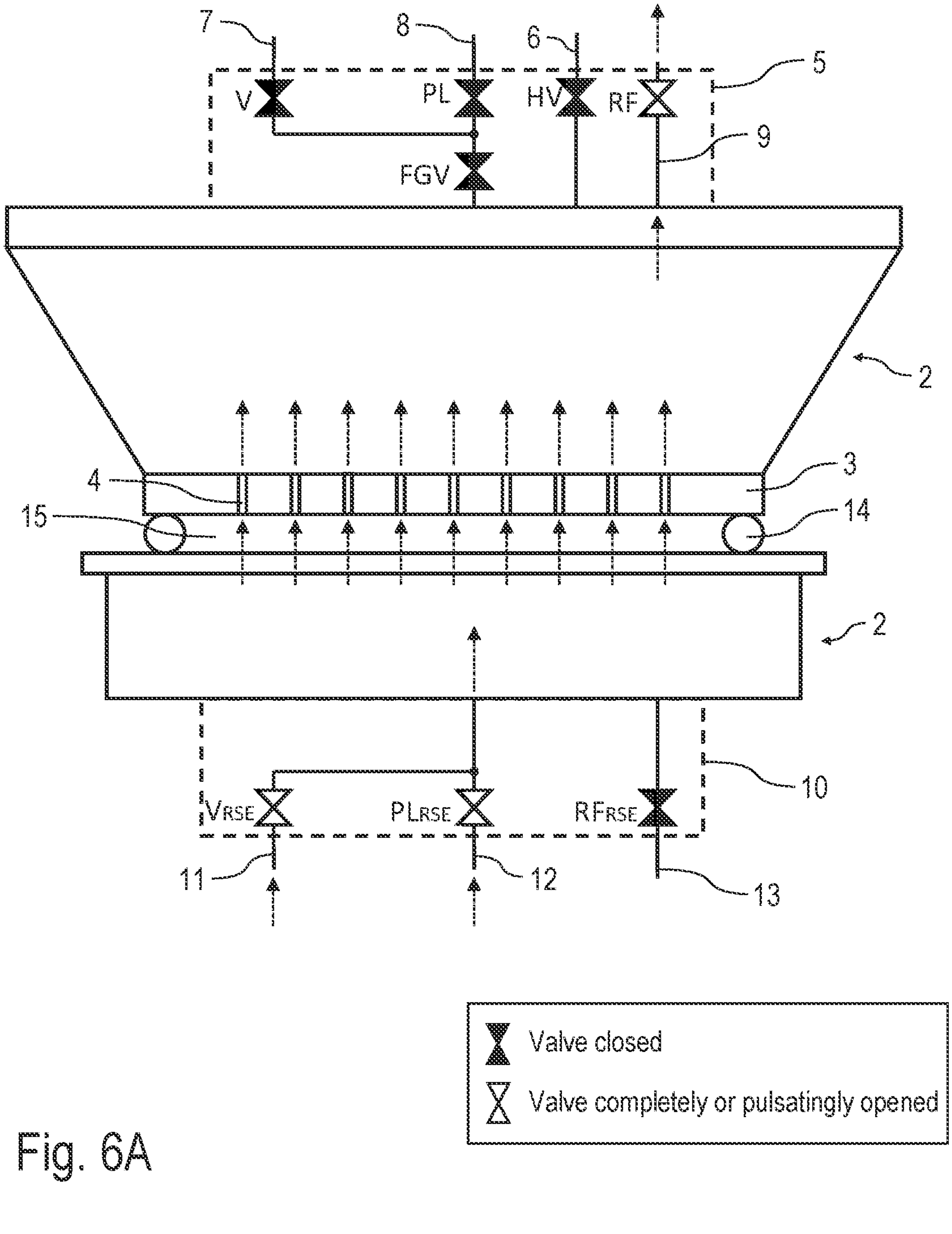
FIG. 6A: a schematic representation of the cleaning device with the nozzle applicator docked in a first cleaning mode for flushing the application nozzles against the normal application direction.
Figure 6B:
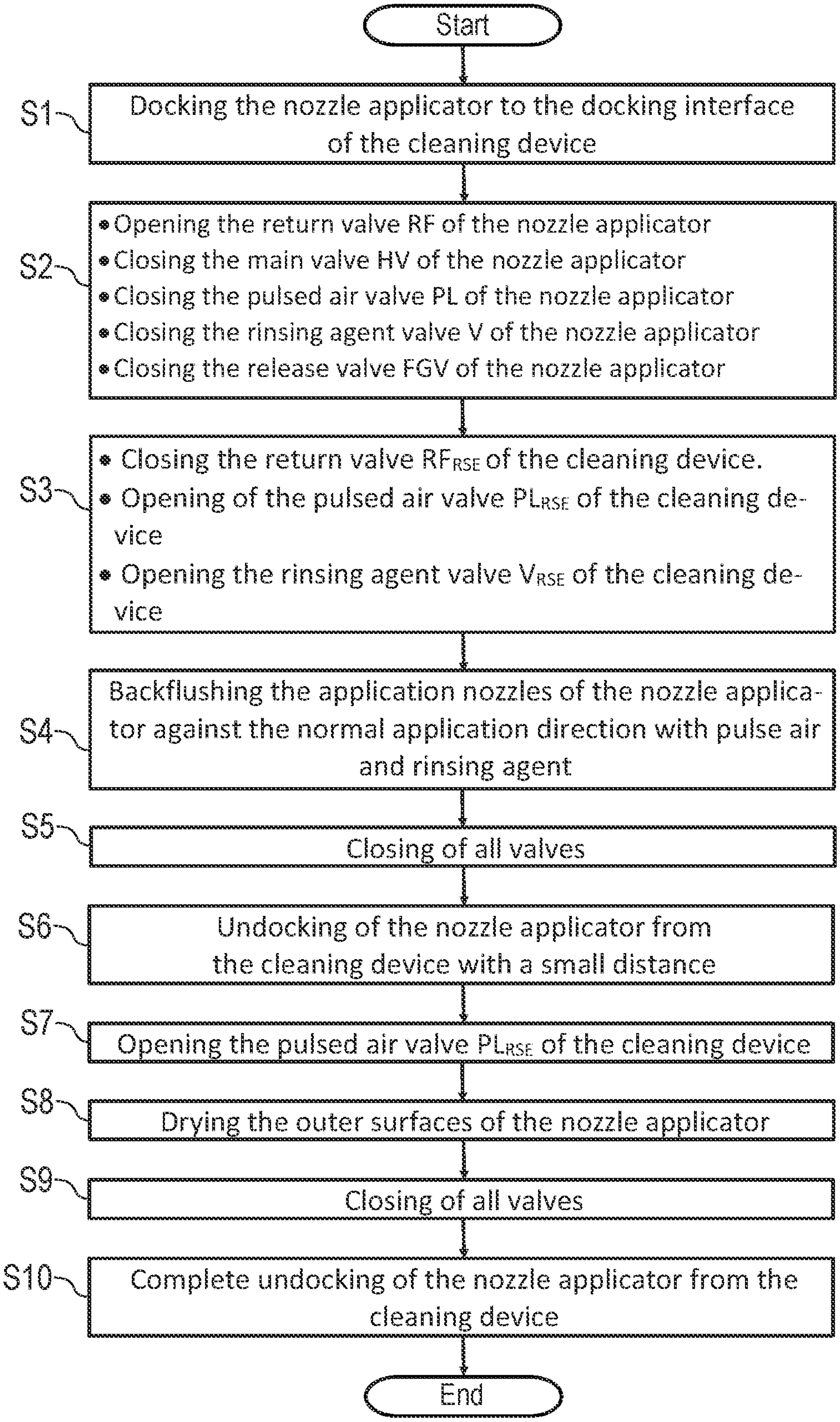
FIG. 6B: a flow chart to illustrate the process steps of the first cleaning mode.

In the following, a first cleaning mode will now be described, which is illustrated in FIGS. 6A, 6B. In this cleaning mode, rinsing agent or pulse air flows through the application nozzles 4 of the nozzle applicator 1 in the opposite direction to their normal application direction, as indicated by arrows in FIG. 6A.

In this first cleaning mode, in the valve unit 5 of the nozzle applicator 1, the rinsing agent valve V, the pulsed air valve PL, the release valve FGV and the main valve HV are closed, while the return valve RF is opened, as also shown in the drawing.

In the valve unit 10 of the cleaning device 2, on the other hand, the return valve $RF_{RSE}$ is closed, while the rinsing agent valve $V_{RSE}$ and the pulsed air valve $PL_{RSE}$ are continuously or pulsatingly open.

In this first cleaning mode, rinsing agent and pulsed air are thus introduced by the cleaning device 2 into the flushing-in space 15 and then flow from there through the application nozzles 4 of the nozzle applicator 1 in the opposite direction to the normal application direction. Finally, coating agent residues, rinsing agent and pulsed air are then discharged via the return system 9 of the nozzle applicator 1.

This cleaning operation is shown in the flow chart according to FIG. 6B in steps S1-S5.

Subsequently, the outer surfaces of the nozzle applicator 1 are dried in steps S6-S10. For this purpose, the nozzle applicator 1 is undocked from the cleaning device 2 and arranged at a small distance from the cleaning device 2 (step S6). Then the pulsed air valve $PL_{RSE}$ of the cleaning device 2 is opened so that compressed air is discharged into the flushing-in space 15 and impinges on the outer surfaces of the nozzle applicator 1 in order to dry them (steps S7, S8). Subsequently, all valves are closed again (step S9) and the nozzle applicator 1 is finally completely undocked from the cleaning device 2 (step S10).

Figure 7A:
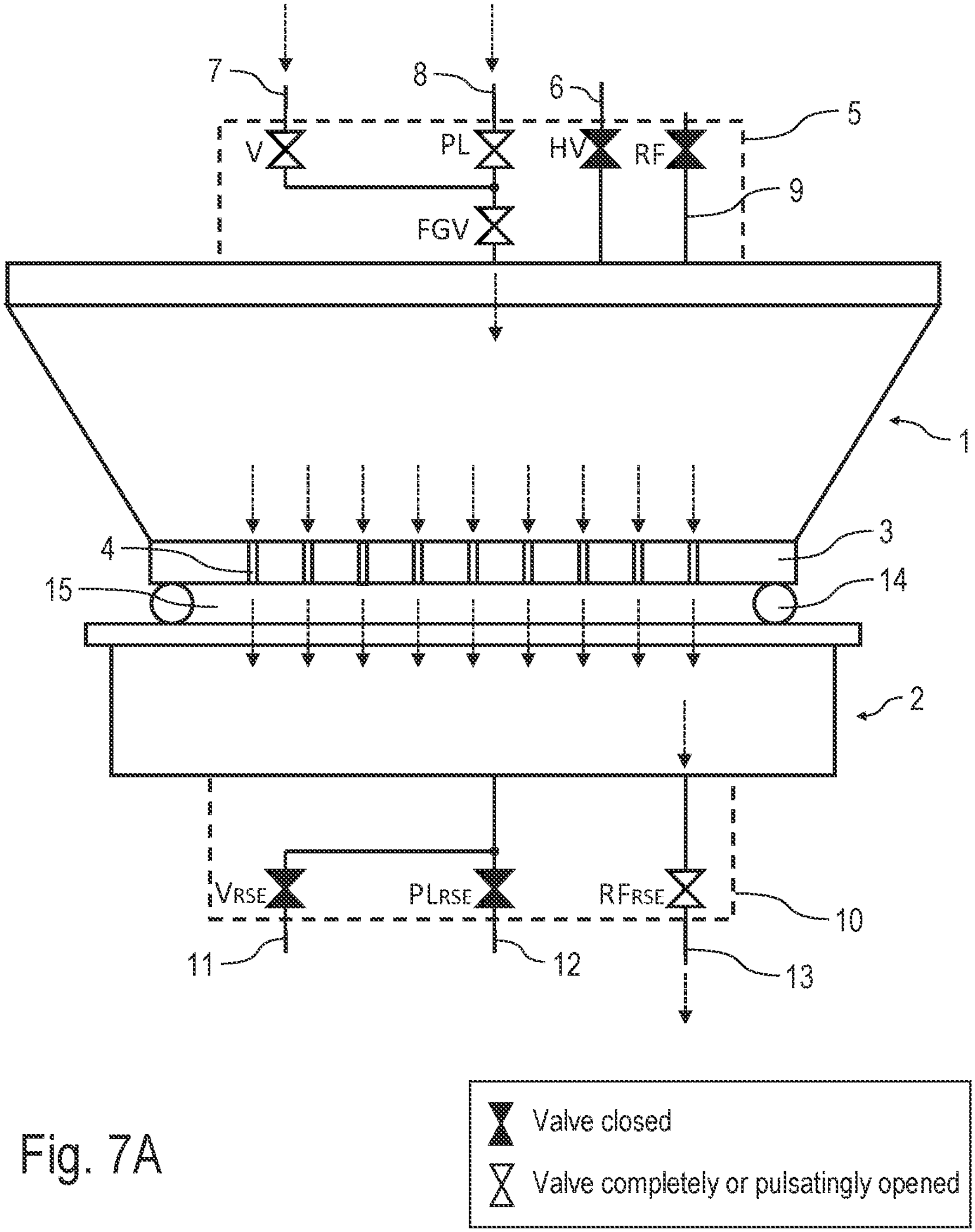
FIG. 7A: a schematic representation of the cleaning device with the nozzle applicator docked in a second cleaning mode, for flushing the application nozzles in the normal application direction.
Figure 7B:
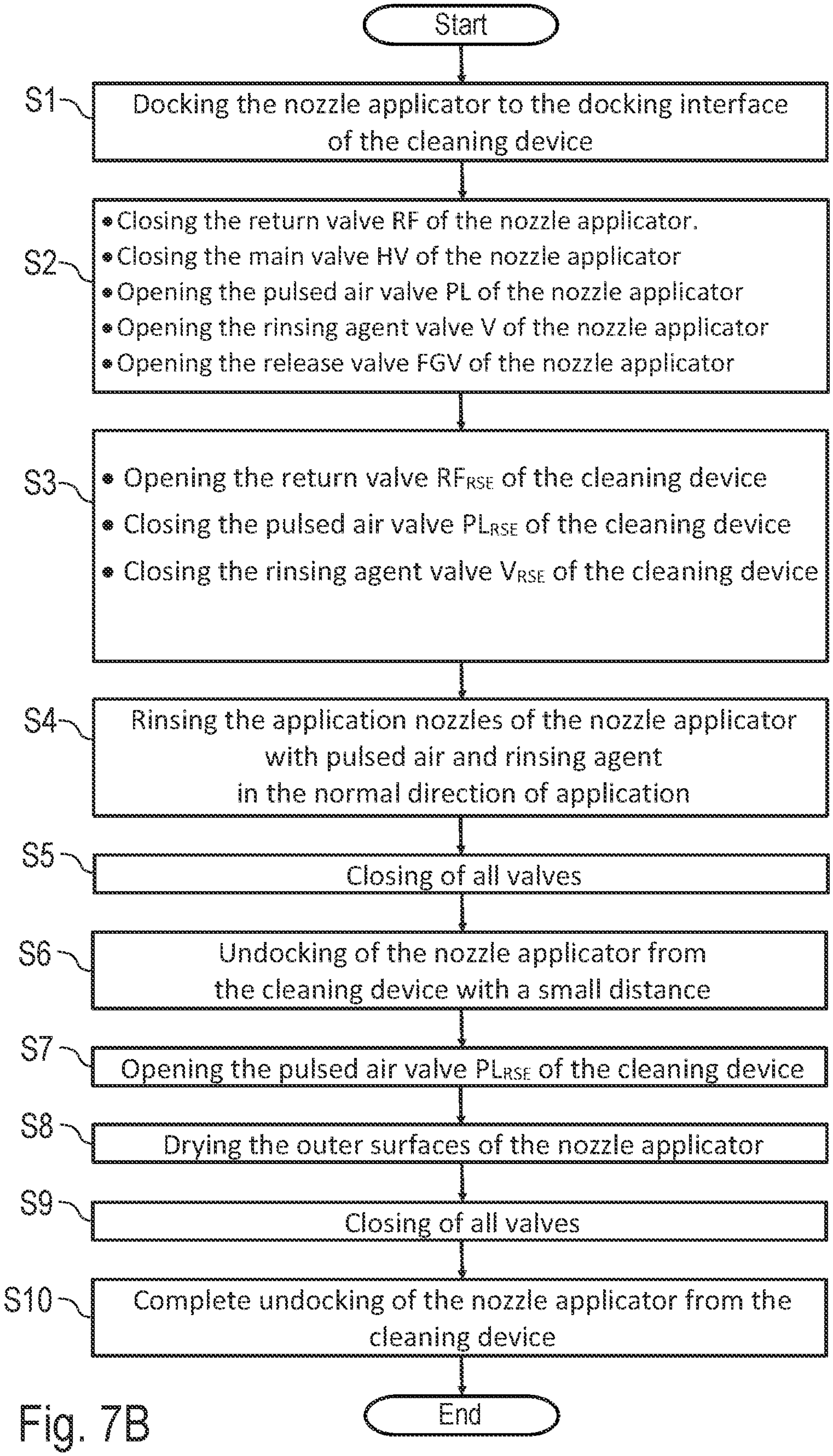
FIG. 7B: a flow chart to illustrate the process steps of the second cleaning mode.

FIGS. 7A and 7B show a second possible cleaning mode in which rinsing agent and pulsed air, respectively, flow through the applicator nozzles 4 of the nozzle applicator 1 in their normal flow direction, as indicated by the arrows in FIG. 7A.

In this second cleaning mode, the main valve HV and the return valve RF of the valve unit 5 of the nozzle applicator 1 are closed, while the rinsing agent valve V, the pulsed air valve PL and the release valve FGV of the valve unit 5 of the nozzle applicator 1 are fully or pulsatingly open (step S2).

In the valve unit 10 of the cleaning device 2, the rinsing agent valve $V_{RSE}$ and the pulsed air valve $PL_{RSE}$ are closed, while the return valve $RF_{RSE}$ is open (step S3).

Thus, in this second cleaning mode, rinsing agent and pulsed air are fed from the nozzle applicator 1 through the application nozzles 4 and then discharged via the return system 13 of the cleaning device 2 (S4).

It should be mentioned here that the cleaning device 2 can operate alternately in the two cleaning modes described above. This is advantageous because the rinsing agent is then moved alternately forward and backward in the application nozzles 4, whereby cloggings in the application nozzles 4 can be effectively loosened and removed.

Figure 8A:
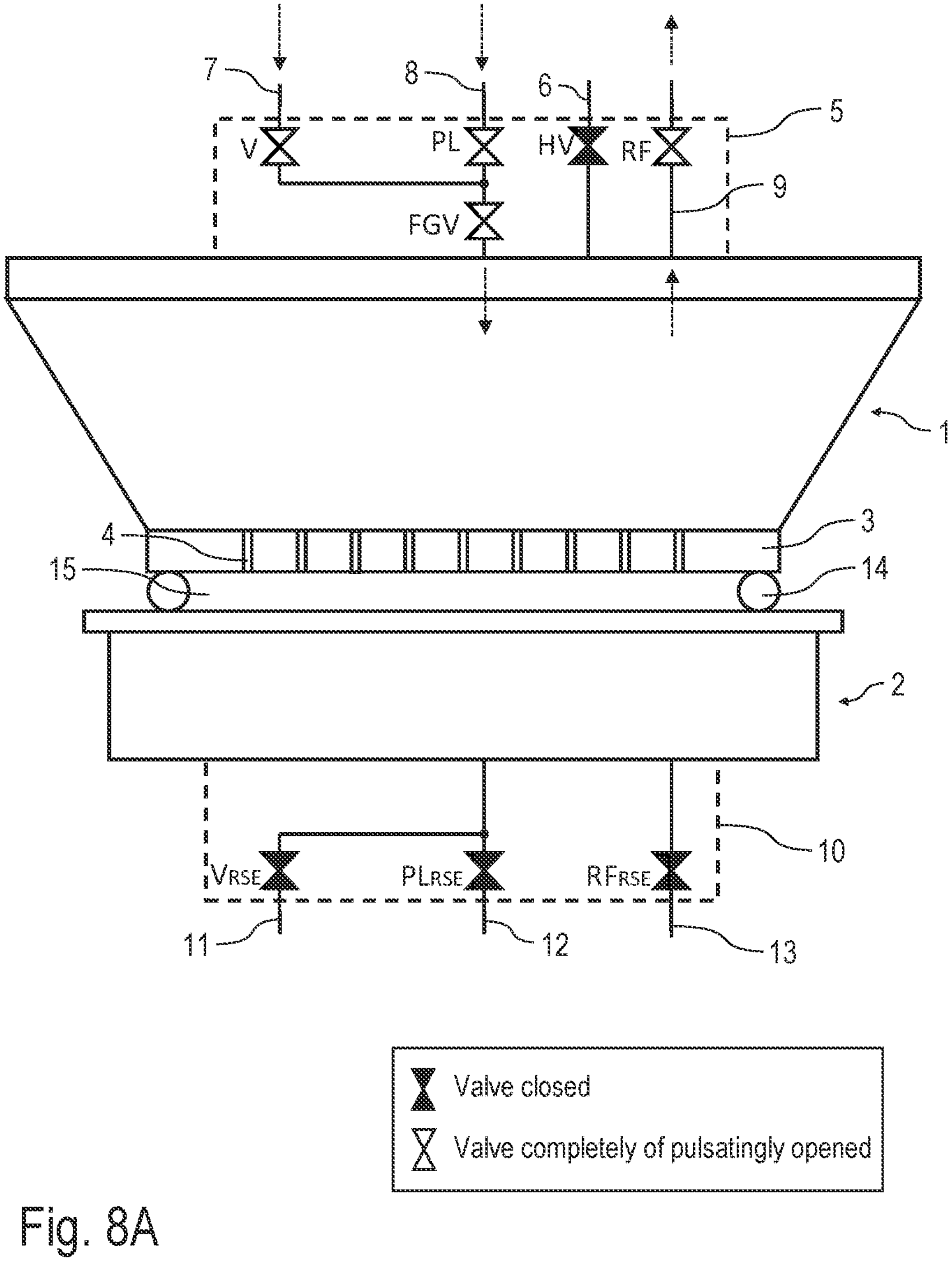
FIG. 8A: a schematic representation of the cleaning device with the nozzle applicator docked in a third cleaning mode for internal rinsing of the cleaning device.
Figure 8B:
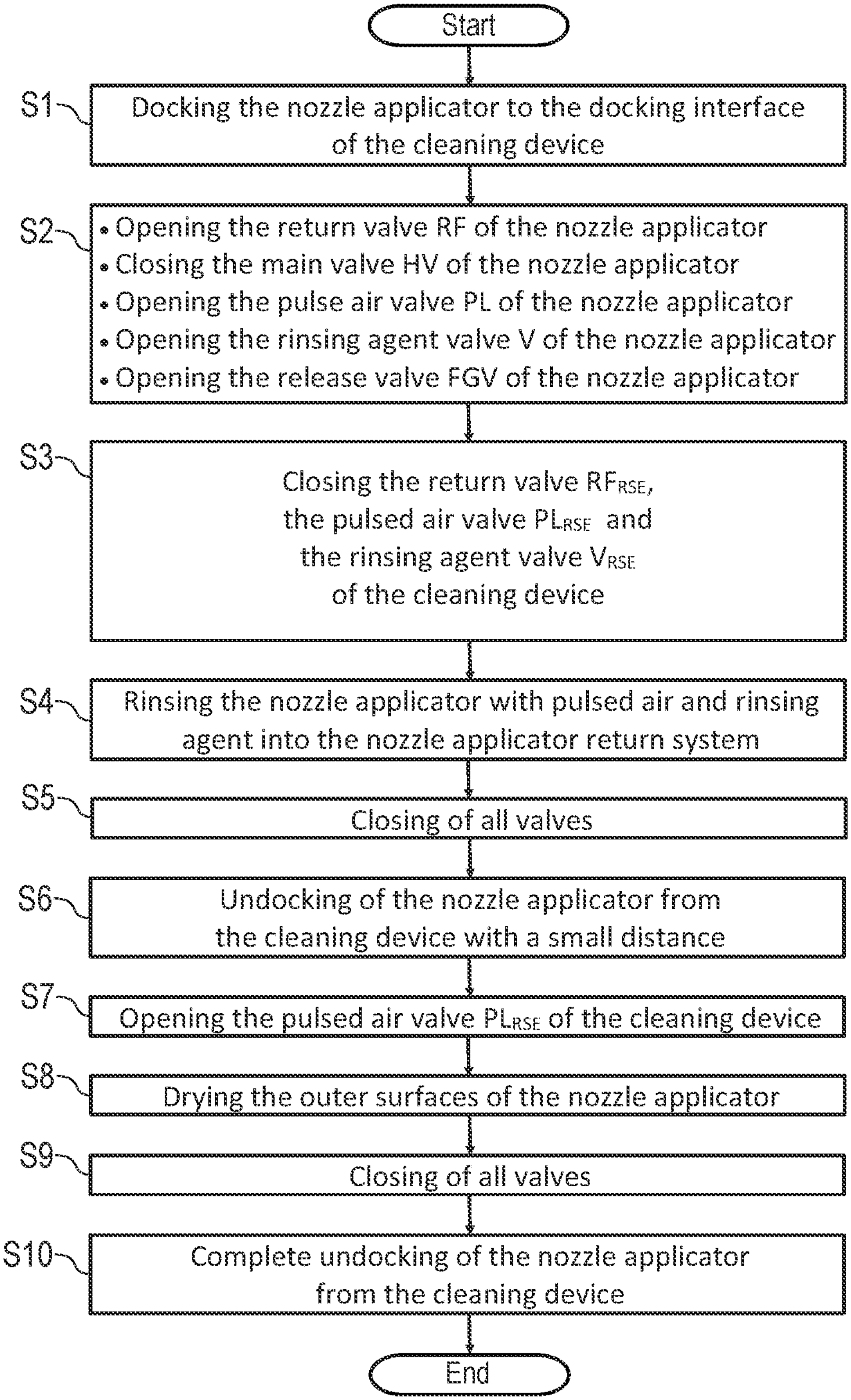
FIG. 8B: a flow chart illustrating the process steps of the third cleaning mode.

FIGS. 8A and 8B show a third possible cleaning mode in which supply and discharge of pulse air and rinsing agent take place via the nozzle applicator 1, i.e. the cleaning device 2 is passive in this cleaning mode.

In the valve unit 5 of the nozzle applicator 1, the rinsing agent valve V, the pulsed air valve PL, the release valve FGV and the return valve RF are open, while the main needle valve HV is closed (step S2).

On the other hand, in the valve unit 10 of the cleaning device 2, the rinsing agent valve $V_{RSE}$, the pulsed air valve $PL_{RSE}$ and the return valve $RF_{RSE}$ are closed (step S3).

Thus, in this cleaning mode, rinsing agent and pulsed air are supplied via the nozzle applicator 1 and then also leave the nozzle applicator 1 via the return system 9 of the nozzle applicator 1 (step S4).

Figure 9A:
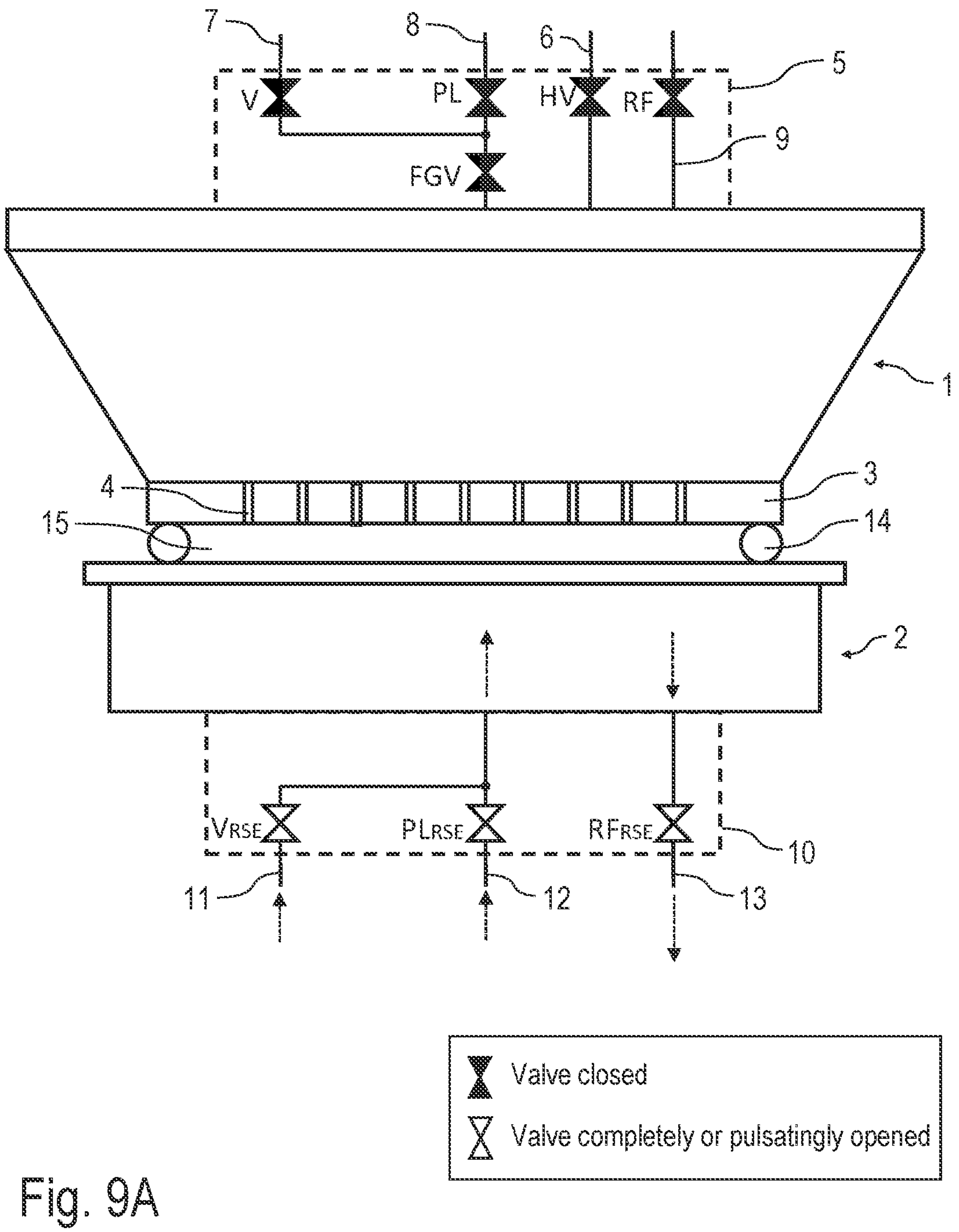
FIG. 9A: a schematic representation of the cleaning device with the nozzle applicator docked in a fourth cleaning mode for internal rinsing of the nozzle applicator.
Figure 9B:
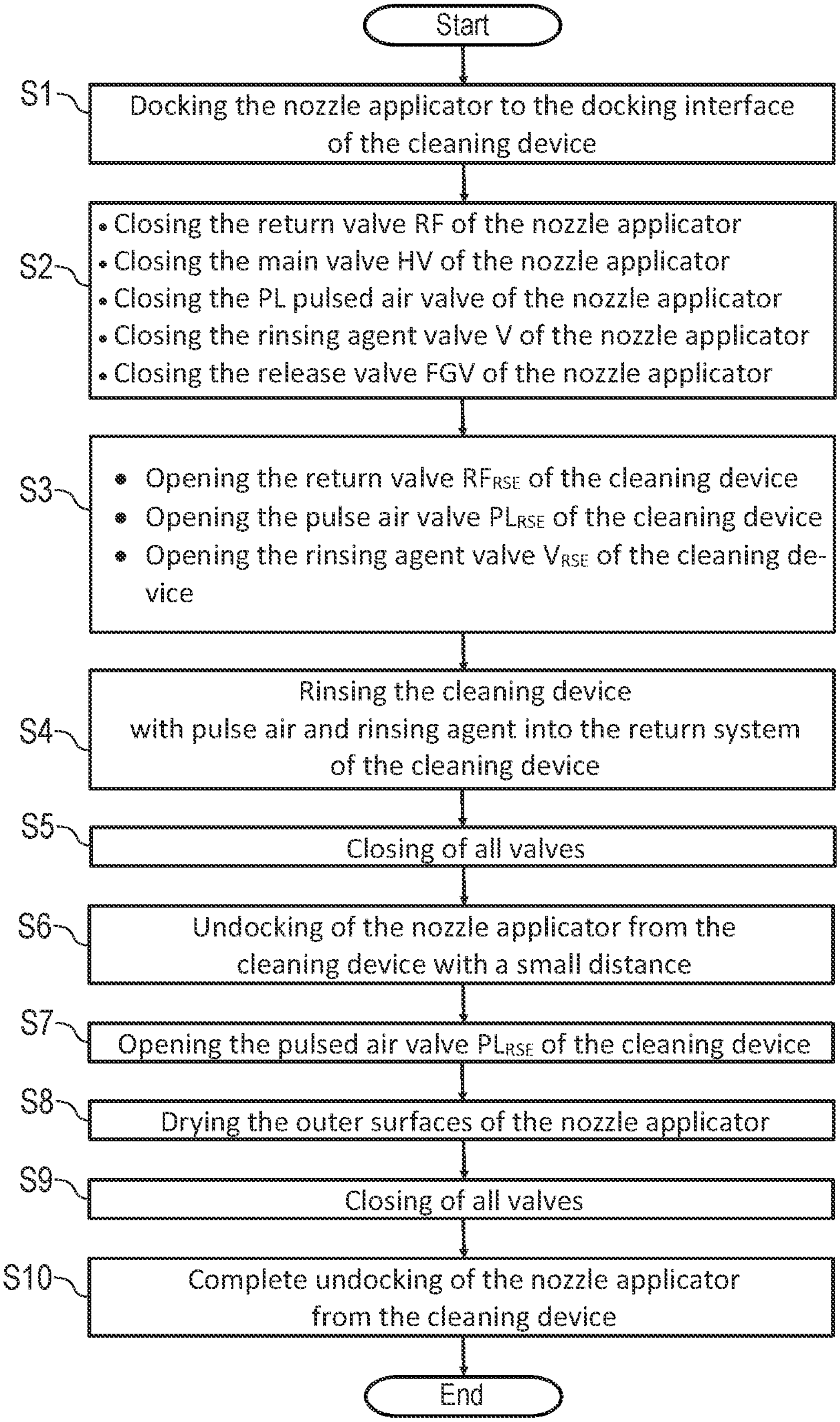
FIG. 9B: a flow chart illustrating the process steps of the fourth cleaning mode.

FIGS. 9A and 9B show a fourth possible cleaning mode in which supply and discharge of pulse air and rinsing agent take place via the cleaning device 2, i.e. the nozzle applicator 1 is passive in this cleaning mode.

In the valve unit 5 of the nozzle applicator 1, the rinsing agent valve V, the pulsed air valve PL, the release valve FGV, return valve RF and the main needle valve HV are closed (step S2).

In the valve unit 10 of the cleaning device 2, on the other hand, the rinsing agent valve $V_{RSE}$, the pulsed air valve $PL_{RSE}$ and the return valve $RF_{RSE}$ are open (step S3).

In this cleaning mode, rinsing agent and pulse air are thus supplied via the cleaning device 2 and then also leave the cleaning device 2 again via the return 13 of the cleaning device 2 (step S4).

Figure 10A:
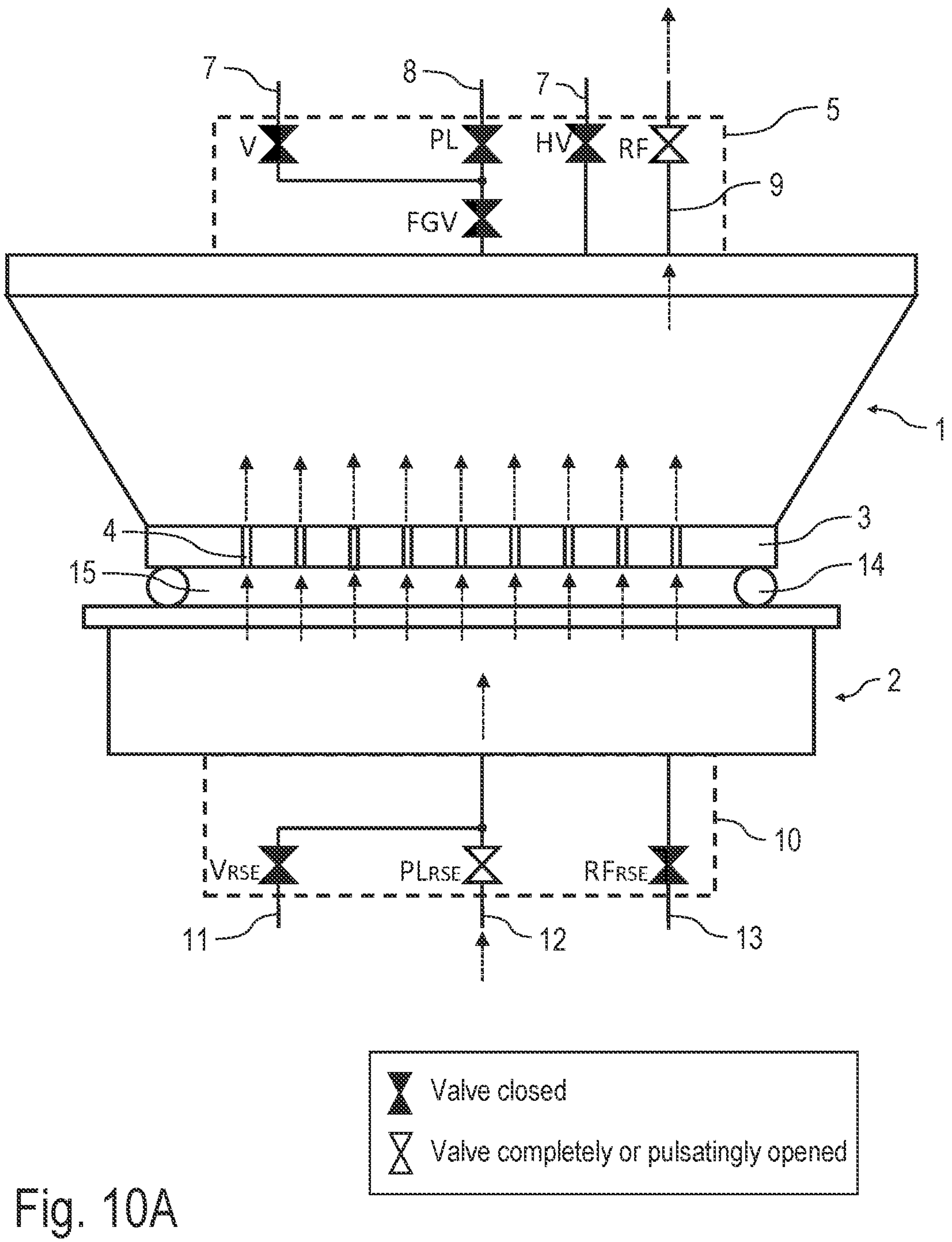
FIG. 10A: a schematic representation of the cleaning device with the nozzle applicator docked in a fifth cleaning mode for blowing out and drying the internal lines and surfaces of the nozzle applicator.
Figure 10B:
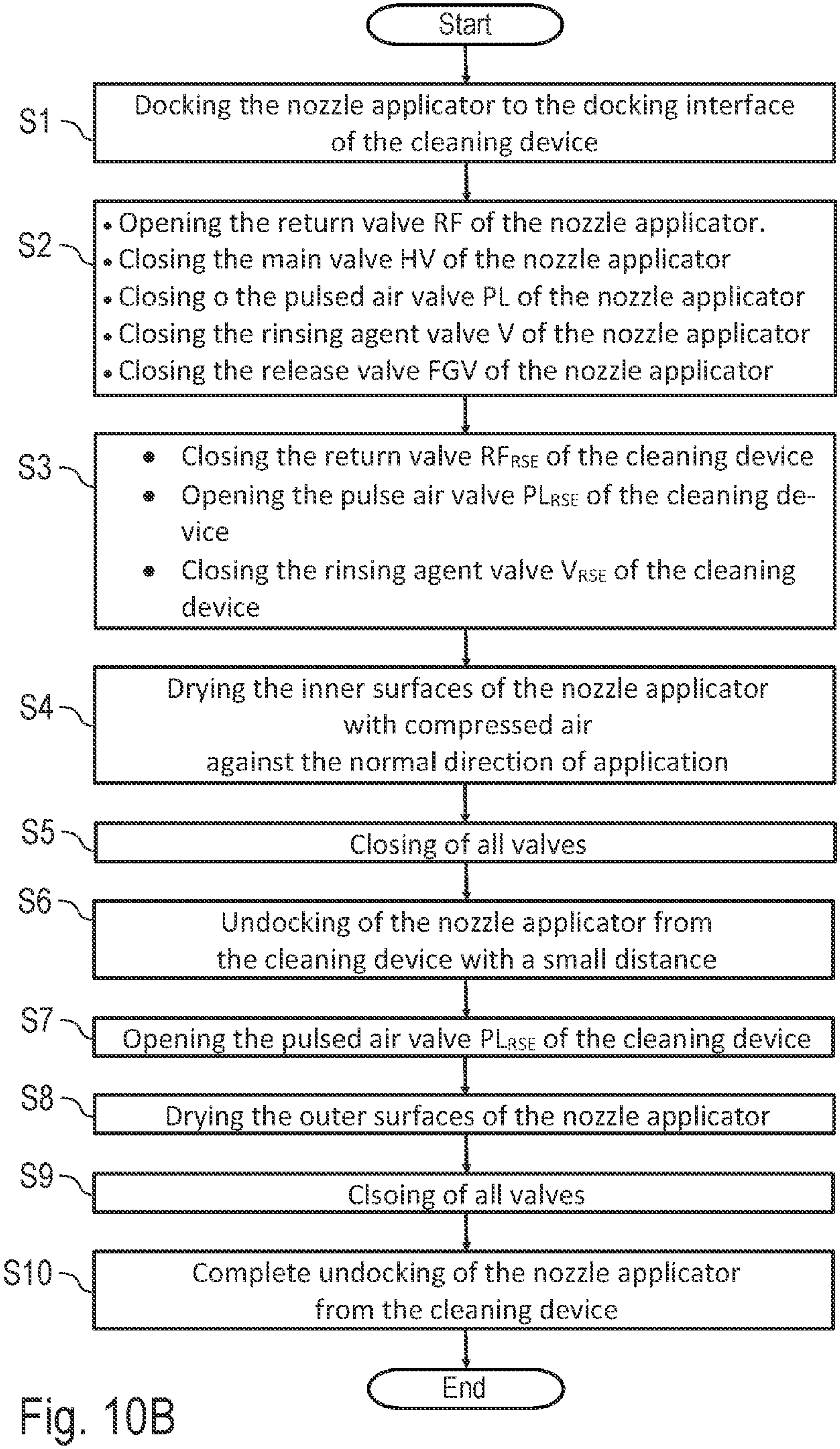
FIG. 10B: a flow chart illustrating the process steps of the fifth cleaning mode.

FIGS. 10A and 10B show a fifth cleaning mode, which has the purpose of detaching contaminants from the internal surfaces and blowing them out of the lines in the nozzle applicator 1.

For this purpose, in the valve unit 5 of the nozzle applicator 1, the rinsing agent valve V, the pulsed air valve PL, the release valve FGV and the main valve HV are closed, while the return valve RF is opened (step S2).

On the other hand, in the valve unit 10 of the cleaning device 2, the rinsing agent valve $V_{RSE}$ and the return valve $RF_{RSE}$ are closed, while the pulsed air valve $PL_{RSE}$ is opened (step S3).

In this cleaning mode, therefore, pulsed air is introduced into the flushing-in space 15 via the cleaning device 2 and then flows through the application nozzles 4 in the opposite direction to the normal application direction. Finally, the pulsed air is then discharged via the return system 9 of the nozzle applicator 1 (step S4).

Figure 11A:
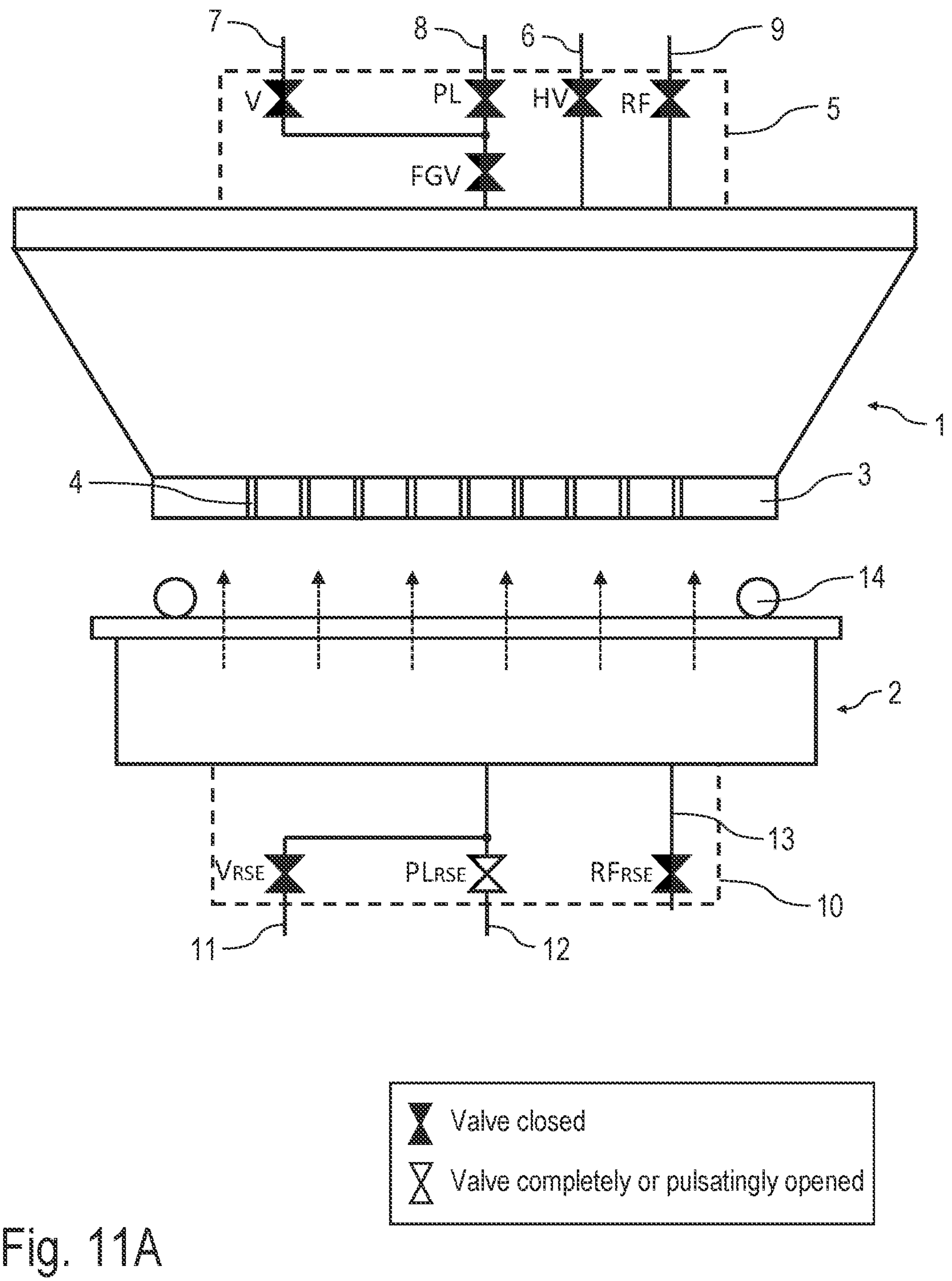
FIG. 11A: a schematic representation of the cleaning device with the undocked nozzle applicator in a sixth cleaning mode for drying the outer surfaces of the nozzle applicator.
Figure 11B:
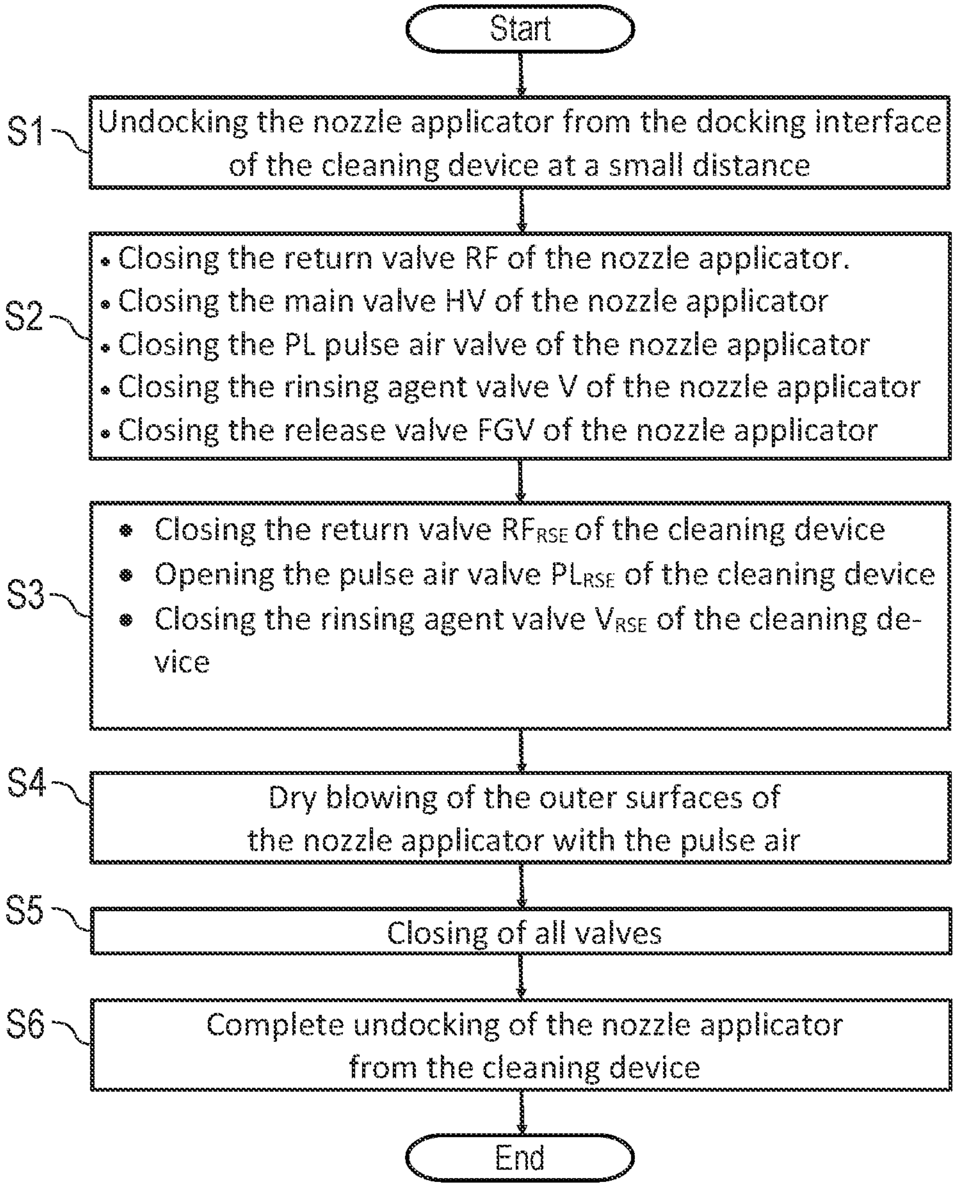
FIG. 11B: a flow chart illustrating the process steps of the sixth cleaning mode.

Finally, FIGS. 11A and 11B show a sixth cleaning mode, which is used to dry the outer surfaces of the nozzle applicator 1 after a cleaning operation.

For this purpose, the nozzle applicator 1 is undocked from the cleaning device 2 and placed at a ge-ring distance from the cleaning device 2 within the effective range of the cleaning device 2, as shown in FIG. 11A (step S1).

In the valve unit 5 of the nozzle applicator 1, all valves are then closed, while in the valve unit 10 of the cleaning device 2, only the pulsed air valve $PL_{RSE}$ is opened (steps S2, S3). The cleaning device 2 then emits pulse air upwards, as indicated by the arrow. The pulse air then flows past and dries the outer surfaces of the nozzle applicator 1 (step S4).

The disclosure is not limited to the preferred embodiments described above. Rather, a large number of variants and variations are possible which also make use of the inventive concept and bring it within the scope of protection

LIST OF REFERENCE SIGNS

1 Nozzle applicator
2 Cleaning device
3 Nozzle plate
4 Application nozzles
5 Valve unit of the nozzle applicator
6 Paint supply of the nozzle applicator
7 Rinsing agent supply of the nozzle applicator
8 Pulsed air supply of the nozzle applicator
9 Return system of the nozzle applicator
10 Valve unit of the cleaning device
11 Rinsing agent supply of the cleaning device
12 Pulsed air supply of the cleaning device
13 Return system of the cleaning device
14 Seal of the docking interface
15 Flushing-in space between nozzle applicator and cleaning device
16 Application robot
17 Jet checking device
18 Coating agent jets
19 Backlight source
20 Diffuser
21 Camera
22 Evaluation unit
23 Control unit
HV Main valve of the nozzle applicator
PL Pulsed air valve of the nozzle applicator
V Rinsing agent valve of the nozzle applicator
FGV Release valve of the nozzle applicator
RF Return valve of the nozzle applicator
$V_{RSE}$ Rinsing agent valve of the cleaning device
$PL_{RSE}$ Pulsed air valve of the cleaning device
$RF_{RSE}$ Return valve of the cleaning device

The invention claimed is:

1. A cleaning device for cleaning a nozzle applicator, the cleaning device comprising:
a rinsing agent valve connected to a rinsing agent supply,
a compressed air valve connected to a compressed air supply,
a docking interface for docking the nozzle applicator to be cleaned to the cleaning device, and
a control unit which controls the rinsing agent valve and the compressed air valve of the cleaning device,
wherein the docking interface is connected to the rinsing agent valve and the compressed air valve, and is positionable relative to the nozzle applicator to flush a rinsing agent from the rinsing agent supply into the nozzle applicator through one or more application nozzles of the nozzle applicator against a normal application direction and through a return valve of the nozzle applicator, and
wherein the control unit switches between a first cleaning mode with a rinsing of the application nozzles against the normal application direction wherein the rinsing agent valve is opened and a second cleaning mode with a rinsing of the application nozzles in the normal application direction wherein the rinsing agent valve is closed.

2. A cleaning device according to claim 1, wherein
a) the docking interface includes a seal that seals off a nozzle region of the nozzle applicator in a fluid-tight and pressure-tight manner in a docked state, in order to be able to flush the rinsing agent into the nozzle applicator through the application nozzles counter to the normal application direction,
b) the seal is annular and surrounds the nozzle region of the nozzle applicator,
c) in the docked state, the cleaning device and the nozzle applicator enclose between them a flushing-in space which is sealed off from a surrounding environment by the seal.

3. A cleaning device according to claim 2, wherein
the cleaning device has a return system for discharging residues of a coating agent, and
a return valve is arranged in the return system of the cleaning device and controls a material flow into the return system of the cleaning device,
the return system and the rinsing agent supply of the cleaning device open into the flushing-in space between the cleaning device and the nozzle applicator.

4. A nozzle applicator system, comprising:
a nozzle applicator, including:
a nozzle applicator rinsing agent valve connected to a rinsing agent supply,
a return system for discharging residues of a coating agent,
a nozzle applicator return valve arranged in the return system of the nozzle applicator to control a material flow into the return system of the nozzle applicator, and
at least one main valve which controls the coating agent delivery, and
a cleaning device, including:
a cleaning device rinsing agent valve connected to the rinsing agent supply,
a cleaning device return valve arranged in a return system of the cleaning device, and
a docking interface for docking the nozzle applicator to the cleaning device,
wherein the docking interface is positioned to flush a rinsing agent from the rinsing agent supply into the nozzle applicator through one or more application nozzles of the nozzle applicator against a normal application direction.

5. A system according to claim 4, further comprising a control unit which controls the following valves:
a) the cleaning device rinsing agent valve of the cleaning device,
b) the cleaning device return valve of the cleaning device,
c) the nozzle applicator rinsing agent valve of the nozzle applicator,
d) the nozzle applicator return valve of the nozzle applicator, and
e) the at least one main valve of the nozzle applicator.

6. A system according to claim 5, wherein the control unit in a first cleaning mode controls the cleaning device rinsing agent valve, the cleaning device return valve, the nozzle applicator rinsing agent valve, and the nozzle applicator return valve as follows:
a) the cleaning device rinsing agent valve of the cleaning device is opened continuously or pulsatingly,
b) the cleaning device return valve of the cleaning device is closed,
c) the nozzle applicator rinsing agent valve of the nozzle applicator is closed,
d) the nozzle applicator return valve of the nozzle applicator is opened.

7. A system according to claim 5, wherein the control unit in a second cleaning mode controls the cleaning device rinsing agent valve, the cleaning device return valve, the nozzle applicator rinsing agent valve, and the nozzle applicator return valve as follows:

a) the cleaning device rinsing agent valve of the cleaning device is closed, b) the cleaning device return valve of the cleaning device is opened, c) the nozzle applicator rinsing agent valve of the nozzle applicator is opened continuously or pulsatingly, d) the nozzle applicator return valve of the nozzle applicator is closed.

8. A system according to claim 5, wherein in a third cleaning mode the control unit controls the cleaning device rinsing agent valve, the cleaning device return valve, the nozzle applicator rinsing agent valve, and the nozzle applicator return valve as follows:

a) the cleaning device rinsing agent valve of the cleaning device is closed, b) the cleaning device return valve of the cleaning device is closed, c) the nozzle applicator rinsing agent valve of the nozzle applicator is opened continuously or pulsatingly, d) the nozzle applicator return valve of the nozzle applicator is opened.

9. A system according to claim 5, wherein the control unit in a fourth cleaning mode controls the cleaning device rinsing agent valve, the cleaning device return valve, the nozzle applicator rinsing agent valve, and the nozzle applicator return valve as follows:

a) the cleaning device rinsing agent valve of the cleaning device is opened continuously or pulsatingly, b) the cleaning device return valve of the cleaning device is opened, c) the nozzle applicator rinsing agent valve of the nozzle applicator is closed, d) the nozzle applicator return valve of the nozzle applicator is closed.

10. A system according to claim 5, wherein in a fifth cleaning mode the control unit controls the cleaning device rinsing agent valve, the cleaning device return valve, the nozzle applicator rinsing agent valve, and the nozzle applicator return valve as follows:

a) the cleaning device rinsing agent valve of the cleaning device is closed, b) the cleaning device return valve of the cleaning device is closed, c) the nozzle applicator rinsing agent valve of the nozzle applicator is closed, d) the nozzle applicator return valve of the nozzle applicator is opened.

11. A system according to claim 5, wherein the control unit in a sixth cleaning mode controls the cleaning device rinsing agent valve, the cleaning device return valve, the nozzle applicator rinsing agent valve, and the nozzle applicator return valve as follows:

a) the cleaning device rinsing agent valve of the cleaning device is closed, b) the cleaning device return valve of the cleaning device is closed, c) the nozzle applicator rinsing agent valve of the nozzle applicator is closed, d) the nozzle applicator return valve of the nozzle applicator is closed.

12. A system according to claim 5, wherein the control unit switches between a first cleaning mode with a rinsing of the application nozzles against the normal application direction and a second cleaning mode with a rinsing of the application nozzles in the normal application direction.

* * * * *